(12) United States Patent
Leininger

(10) Patent No.: US 7,095,142 B2
(45) Date of Patent: Aug. 22, 2006

(54) PNEUMATIC TOOL WITH INTEGRATED ELECTRICITY GENERATOR

(75) Inventor: Jon J. Leininger, Centerville, IA (US)

(73) Assignee: H&S Autoshot Manufacturing, Ontario (CA)

( * ) Notice: Subject to any disclaimer, the term of this patent is extended or adjusted under 35 U.S.C. 154(b) by 0 days.

(21) Appl. No.: 10/851,532

(22) Filed: May 21, 2004

(65) Prior Publication Data

US 2005/0258694 A1    Nov. 24, 2005

(51) Int. Cl.
*H02K 7/00* (2006.01)
(52) U.S. Cl. .............................. 310/47; 310/50; 290/54
(58) Field of Classification Search .................... None
See application file for complete search history.

(56) References Cited

U.S. PATENT DOCUMENTS

| | | | | |
|---|---|---|---|---|
| 3,731,384 A * | 5/1973 | Brooks et al. | ................. | 433/32 |
| 4,283,633 A | 8/1981 | Gijbels et al. | ............... | 290/1 R |
| 4,678,922 A | 7/1987 | Leininger | .................... | 290/54 |
| 4,805,404 A * | 2/1989 | Dupin | .......................... | 60/409 |
| 5,473,519 A | 12/1995 | McCallops et al. | ......... | 362/120 |
| 5,525,842 A | 6/1996 | Leininger | .................... | 290/54 |
| 5,801,454 A * | 9/1998 | Leininger | .................... | 290/54 |
| 5,982,059 A | 11/1999 | Anderson | ..................... | 310/50 |
| 6,107,692 A | 8/2000 | Egri et al. | ..................... | 290/43 |
| RE36,917 E | 10/2000 | Leininger | .................... | 290/54 |
| 6,530,436 B1 | 3/2003 | Nowak, Jr. et al. | ......... | 173/168 |
| 6,703,738 B1 | 3/2004 | Yoshikawa et al. | ........... | 310/91 |
| 6,713,905 B1 * | 3/2004 | Hirschburger et al. | ........ | 310/47 |
| 6,906,466 B1 * | 6/2005 | Feng | ........................... | 315/55 |

FOREIGN PATENT DOCUMENTS

FR        2523891 A  *  9/1983

* cited by examiner

*Primary Examiner*—Joseph Waks
(74) *Attorney, Agent, or Firm*—Thomas, Kayden, Horstmeyer & Risley, LLP

(57) ABSTRACT

A rotor for a pneumatic tool having electricity-generating capabilities includes a shaft and an integral rotor body. The rotor body includes recesses dimensioned to receive an insulated subassembly having a magnet received within a nonmagnetic insulator to allow flux to be concentrated against stator windings. The rotor can be used in a conventional pneumatic tool, but can also be fitted with the insulated subassemblies in order to cooperate with a stator in the tool to generate electricity upon rotation of the rotor when pressurized fluid is applied to the vanes. A ring stator is connected to a supporting circuit by a connector and is supportable by a nonmagnetic end plate of the pneumatic tool and is disposed between the rotor and the rotor bearing.

14 Claims, 9 Drawing Sheets

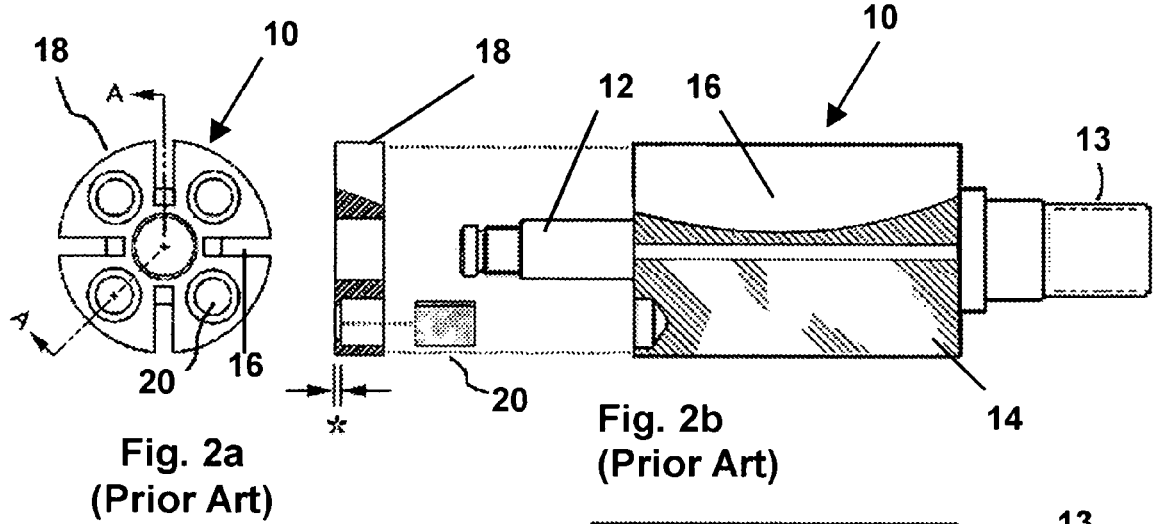
Fig. 2a
(Prior Art)
Fig. 2b
(Prior Art)
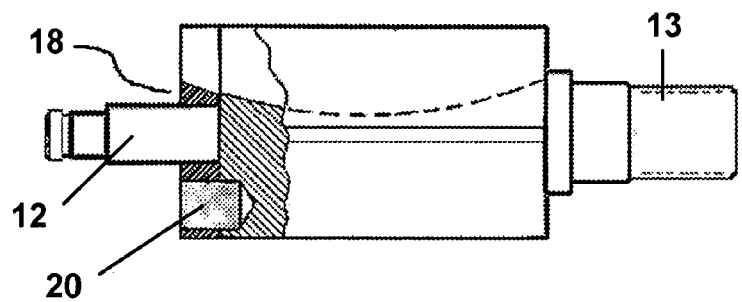
Fig. 2c
(Prior Art)

PNEUMATIC TOOL WITH INTEGRATED ELECTRICITY GENERATOR

FIELD OF THE INVENTION

The following is directed in general to pneumatic tools with integrated electricity generators, and more particularly to an integrated electricity generator having insulated subassemblies embedded in its rotor, and a compact stator supportable by the tool endplate.

BACKGROUND OF THE INVENTION

Conventional pneumatic tools, such as a pneumatic wrench, sander or grinder, typically include a motor comprised of a rotor mounted on ball bearings supported by front and rear end plates, positioned on each end of a cylinder, for rotation of the rotor within the cylinder. The rotor and cylinder are non-concentrically aligned to provide a chamber along the length of one side of the rotor for receiving pressurized fluid. The motor is further enclosed within the tool housing. The rotor is slotted lengthwise in a number of equidistant locations about its circumference to support vanes that radially slide in the slots enabling consistent contact between the vane and the inside cylinder wall as the vanes enter and exit the chambered area. Each time a vane enters the chamber, it receives a flow of pressurized fluid passing through the cylinder from the housing and thereby causing the rotor to rotate within the motor and tool housing. Gear teeth on the rotor's shaft transmit rotational force to the working end of the tool.

U.S. Pat. No. 4,678,922 (Leininger) discloses a system for generating electricity using the flow of pressurized fluid such as air in a pneumatic tool by way of a magnetic coupling between a specially designed rotor and a stator. Magnetic means are affixed to the tool rotor, and thereby cooperate during rotation with a stator mounted in the tool housing, motor cylinder or bearing end plate to induce electrical current in the coils of the stator. The '922 disclosure thus provides an integrated, self-contained and self-powered lighting source for illuminating a workpiece. Various improvements have been made to integrated electricity generators in order to improve their electrical output, longevity, usability and efficiency, and also to reduce their size. Examples of such improvements may be found in U.S. Pat. No. 5,525,842 (also to Leininger) in which various configurations of rotor, stator and light supplies are introduced.

Rotors manufactured for use in conventional pneumatic tools are typically machined from steel alloys as a single piece that can be hardened to acceptable standards by heat-treating after machining. Hardening is generally required especially for the pinion area on the rotor shaft because of the rigors undertaken by gear teeth during use of the tool. The drive gear and vane slots in a pneumatic tool rotor are typically machined prior to heat treatment, while the metal is relatively ductile.

When providing a conventional pneumatic tool such as an air tool with electricity generation capabilities, a special rotor appended to a nonmagnetic extension for housing magnets replaces the conventional rotor. The nonmagnetic extension is used to help enhance polar distinction between north and south magnet orientations and to isolate or magnetically insulate magnets as much as possible from the ferromagnetic influences of the steel rotor within the air chamber of a steel air cylinder, and any other magnetic influences in or outside the tool that could interfere with the focus of flux against stator windings.

Because it is difficult to cut down a heat-treated rotor in order to add magnets and a nonmagnetic extension (made of, for instance, nonmagnetic zinc, 300 series stainless steel or aluminum), a special steel rotor having a shortened rotor body is turned, slotted, drilled, hobbed and heat treated and the nonmagnetic extension and magnets are subsequently appended to the rotor body. In an alternative method, a new shaft is machined and heat treated, and subsequently received by a new and nonmagnetic rotor body in which magnets may themselves be received.

As would be understood by one of ordinary skill in the art, machining a special rotor in order to accommodate magnets for inducing electricity in a stator can be complex, time-consuming and accordingly expensive. Furthermore, a manufacturer intent on providing both conventional and electricity-generating models of a particular pneumatic tool must plan for very different methods of manufacture of corresponding rotors.

Conventional pneumatic tools offered by various manufacturers have varying proprietary sizes, shapes, tolerances, operation parameters and the like. As such, each manufacturers' tool also requires a unique stator to generate electricity efficiently and effectively for that tool. Furthermore, pneumatic tools having electricity generating capabilities typically require different magnet-side end plates from their conventional counterparts because of the need to accommodate the size and shape of stator coils and possible supporting circuitry. In addition, size and shape of the tool itself place constraints on the number of windings used for stator coils, the physical placement of supporting circuitry, and location of a pathway for directing generated electricity to its intended load. As would be understood, stator core permeability, size of coils and amount of magnetic interference each factor into the amount of EMF produced by a generator, while considerations such as component cost, manufacturability and degree of variation from a conventional counterpart all contribute to the overall cost of the tool.

Thus, improvements in the manufacturability of tools incorporating such electricity generators are sought.

SUMMARY OF THE INVENTION

According to an aspect of the present invention, a rotor body for an integrated pneumatic motor generator has formed therein recesses. The recesses receive an insulated subassembly, which comprises a magnet within a nonmagnetic insulator, whereby the magnet is substantially magnetically insulated or isolated from the rotor body by the nonmagnetic insulator. Because the rotor only requires a number of recesses to be formed in its rotor body to receive the subassemblies, it requires little additional machining over a conventional pneumatic tool counterpart.

According to a further aspect of the invention, a ring stator is formed of a flat annular substrate having poles projecting therefrom, wherein coils are centered on the poles and connected to a connector. The ring stator is dimensioned to be placed between a rotor and the rotor bearing such that flux is directed towards the coils at least in part by the bearing.

According to a still further aspect of the invention, a nonmagnetic end plate for supporting a ring stator comprises an annular end wall dimensioned to receive a rotor shaft and an annular side wall depending from the end wall and dimensioned to support the ring stator. The annular side wall has formed therein a slot for accommodating a connector from the ring stator to a load, and cavities for accommodating coils of the ring stator. The ring stator may be placed within the end plate such that its coils cooperate with magnets on a rotating rotor to generate electricity.

These together with other aspects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A detailed description of the preferred embodiment is set forth in detail below, with reference to the following drawings, in which:

FIG. 2a is an end view of a replacement rotor according to the prior art to couple with a nonmagnetic extension and rotor magnets;

FIG. 2b is a side sectional exploded view of the replacement rotor of FIG. 2a, taken along the lines A—A;

FIG. 2c is a side sectional view of the assembled replacement rotor of FIG. 2a, taken along the lines A—A;

DETAILED DESCRIPTION OF THE PREFERRED EMBODIMENT

A conventional pneumatic tool is comprised of a casing onto which is connected a fluid hose. The fluid hose conducts compressed fluid, such as air, from a source through the casing of the tool, causing a rotor within the motor housed by the casing to rotate by effecting force on vanes on the rotor. The rotor, in turn, causes force to be transmitted from a pinion on the rotor through planetary gearing, to drive a ratchet of a wrench, abrasive disk of a grinder etc. at a working end of the tool. While some pneumatic tools make use of gearing in order to transmit rotational force to the working end of the tool, others do so simply by employing a threaded shaft and a collet, or other means appropriate to the primary application of the tool.

Figure 1:
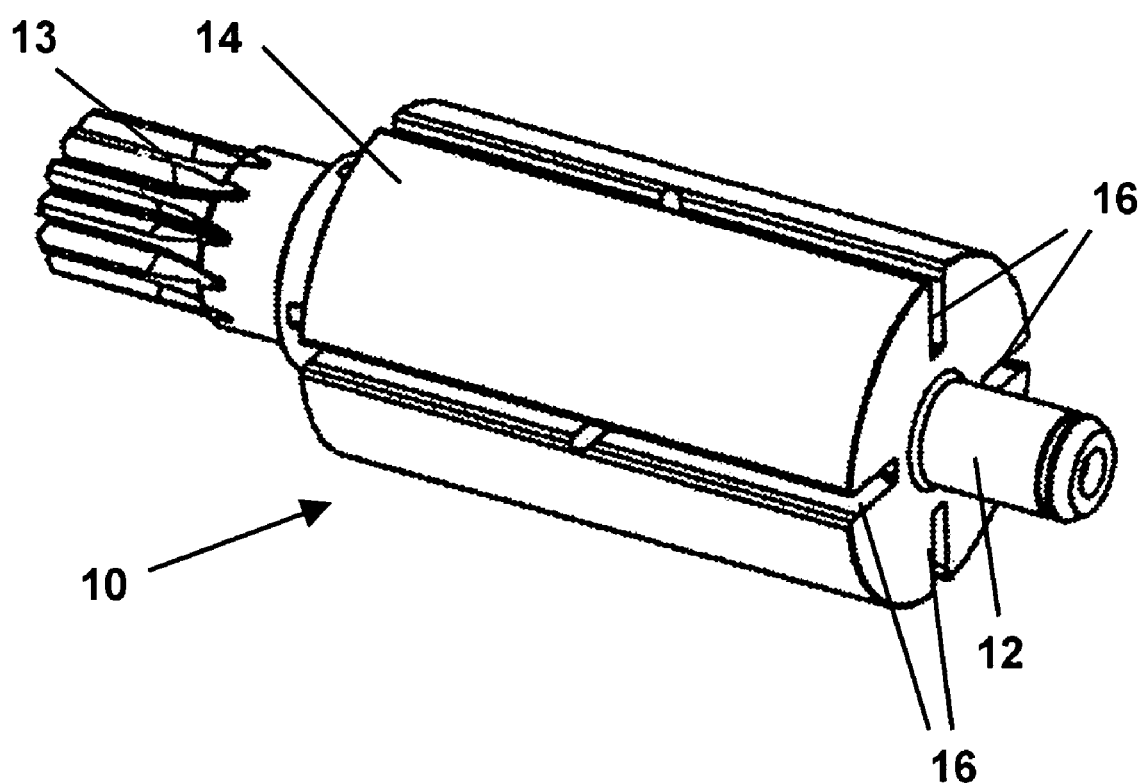
FIG. 1 is a perspective view of a conventional pneumatic tool rotor.

FIG. 1 is a perspective view of a rotor 10 for a conventional pneumatic tool. Rotor 10 comprises a shaft 12 upon which is affixed a rotor body 14. Shaft 12 has formed therein gear teeth 13 for enabling shaft 12 to transmit rotational force through gears to the working end of the tool, which may comprise a ratchet of a wrench, abrasive disk of a grinder etc. Rotor body 14 and shaft 12 are typically cast or machined from bar stock as a single unit, but may be designed as an assemblage of more than one part requiring additional assembly operations to finalize the component. Rotor body 14 has formed therein a plurality of slots 16 for receiving vanes (not shown), which, during operation, catch fluid flowing through the air cylinder chamber of the tool, causing rotor 10 to rotate. Rotor 10 may be formed by casting or pressed powdered metal (PPM) with finishing by machine to attain required tolerance, screw or CNC machining from bar stock, or a combination of methods, using for instance heat-treatable steel. Two grades of heat-treatable steels widely used for high-grade rotors in pneumatic tools made by machine methods are the AISI 41 L40 and 4140 grades.

As would be understood by one of ordinary skill in the art, the mechanical properties of rotors depend not only on the material used, but on a number of heat-treating factors which include sequence of temperature changes, time of retention at certain temperatures and rate of cooling therefrom.

A pneumatic tool having electricity-generating capabilities is similar in operation to a conventional pneumatic tool. However, some components are either replaced, modified or added to take advantage of the relative movement between the rotor and the stationary elements of the air motor or tool casing in order to generate electricity. Magnets mounted on the tool's rotor cooperate during rotation under influence of compressed fluid flow with coils of a stator mounted within the cylinder or end plate of the motor, or tool casing to generate electricity in the stator coils. Because of the component replacements, modifications and additions (to be described hereafter), tools having electricity-generating capabilities have been known to be somewhat different in construction from their conventional counterparts.

FIG. 2a is an end view of a known rotor 10 for an electricity generating pneumatic tool. Rotor 10 of FIG. 2a is similar to that shown in FIG. 1, except it has been created to fit within the pneumatic tool motor while also coupling with nonmagnetic extension 18 and rotor magnets 20. Rotor magnets 20 of rotor 10 cooperate with coils of a stator (not shown) that is mounted within the ball bearing retaining end plate on a side of the cylinder of the motor within the tool, to produce electricity during movement of rotor 10 relative to the stator housed by the end plate. FIG. 2b is a side sectional exploded view of the rotor 10 of FIG. 2a, taken along the lines A—A. Rotor body 14 of rotor 10 in FIG. 2b is shorter than the rotor body in FIG. 1, so as to accommodate the additional thickness of appended nonmagnetic extension 18, while still fitting within the motor and casing of the pneumatic tool. Nonmagnetic extension 18 receives magnets 20, is pressed and cemented to rotor body 14, checked for tolerance and machined finished accordingly. FIG. 2c is a side sectional view of the assembled rotor 10 of FIG. 2a, taken along the lines A—A. As would be understood by one of ordinary skill in the art, the process of forming an entirely unique rotor 10 and nonmagnetic extension 18, affixing the two and ensuring the assembly fits within the required tolerances of the motor is a complex undertaking involving additional operations to manufacture over that of a conventional rotor.

Figures 3A, 3B, 3C:
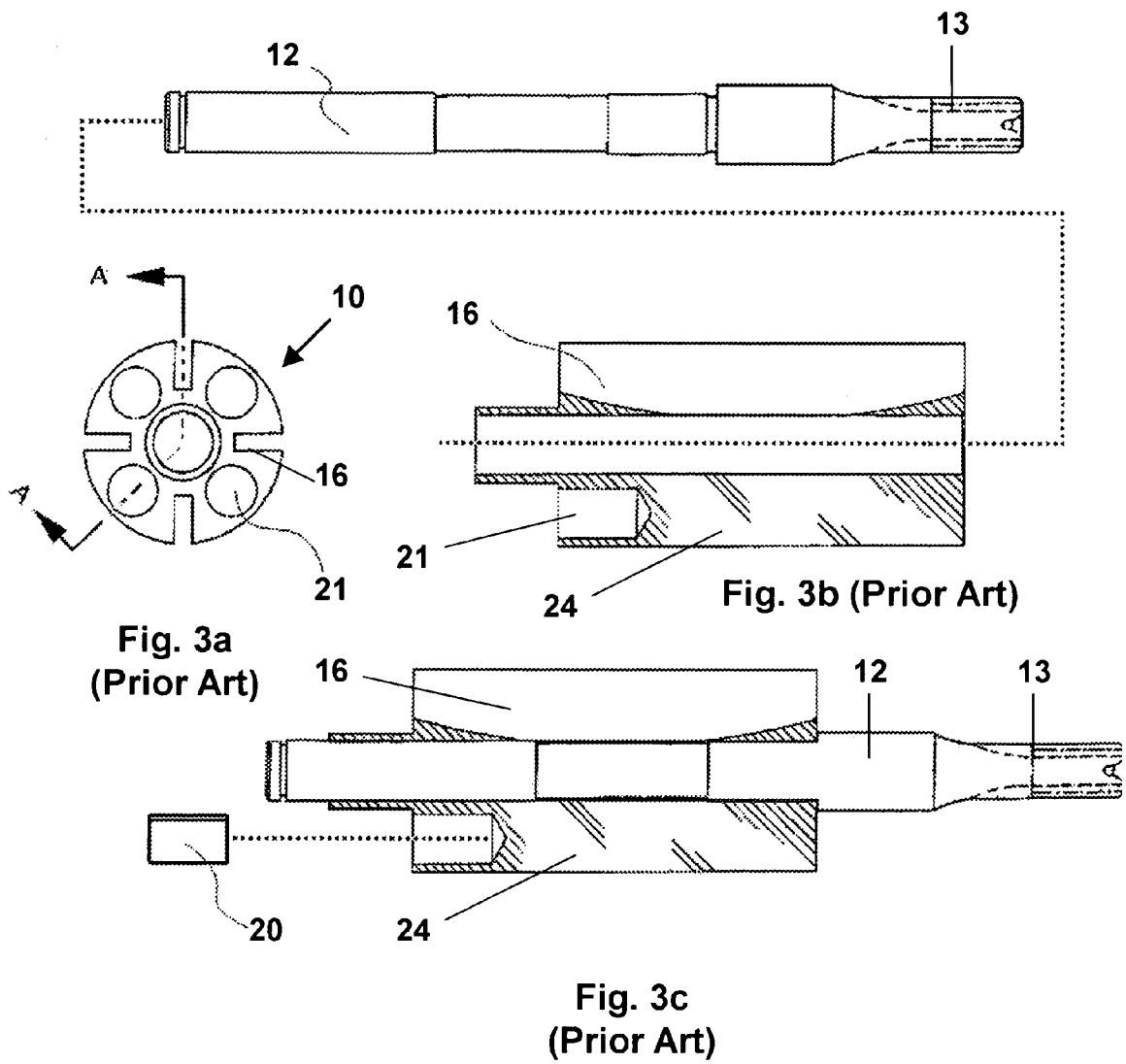
FIG. 3a is an end view of an pneumatic tool rotor having a nonmagnetic rotor body and a steel shaft, according to the prior art.
FIG. 3b is a side sectional exploded view of the rotor of FIG. 3a, taken along the lines A—A.
FIG. 3c is a side sectional view of the rotor of FIG. 3a, taken along the lines A—A, showing the placement of a magnet with respect thereto.

FIGS. 3a–c show a different pneumatic tool rotor 10 having a nonmagnetic rotor body 24 and a steel shaft 12, according to the prior art. The rotor body 24 is machined out of 7075 high tensile strength aluminum—a light weight, nonmagnetic material that can be heat treated to improve strength. Rotor body 24 of 7075 can further be hardcoat anodized with Teflon (trade mark), a known chemical lubricant, in order to improve wear resistance to the sliding air vane regions. Shaft 12 is turned and hobbed out of a harder material, such as shaft grade heat-treatable steel, because gear teeth 13 must withstand a great deal of wear relative to rotor body 24. Rotor body 24 must only typically accommodate sliding vanes made of, for instance, conventional canvas reinforced, oil impregnated phenolic plastic or one of the Nylon/Kevlar/Teflon composites. Shaft 12 is press fit into nonmagnetic rotor body 24 and affixed using a two-part catalytic structural adhesive. The nonmagnetic rotor body 24 fixedly receives magnets 20 therein. While the hybrid rotor 10 shown in FIGS. 3a–c can be advantageously light due to the extensive use of 7075 aluminum, the process of forming an entirely unique rotor that accommodates magnets 20 is a complex procedure. A rotor body and separate shaft must be formed and then affixed, the latter of which is a specialized operation requiring additional fixturing and demanding rigorous adherence to specified tolerance as major requirements.

It is well understood that no known material can actually fully insulate or obstruct magnetic flux. As such, use herein of the term "insulate" or derivations thereof is intended to mean, substantially, "to cause to be in a detached or isolated position" from direct contact with surrounding material, much as would be understood by the word "isolate".

Figure 4A:
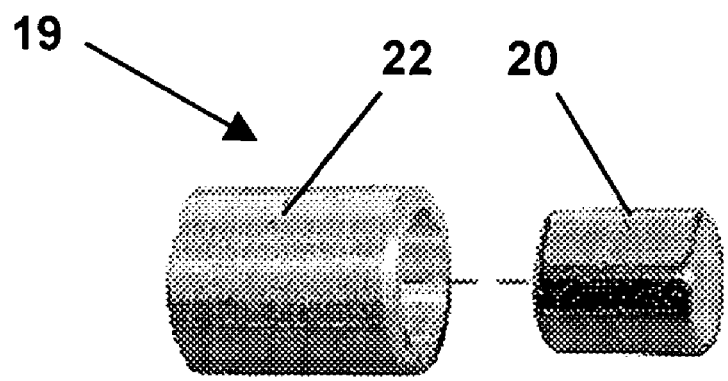
FIG. 4a is an isometric exploded view of a magnet subassembly according to an embodiment of the present invention.
Figure 4B:
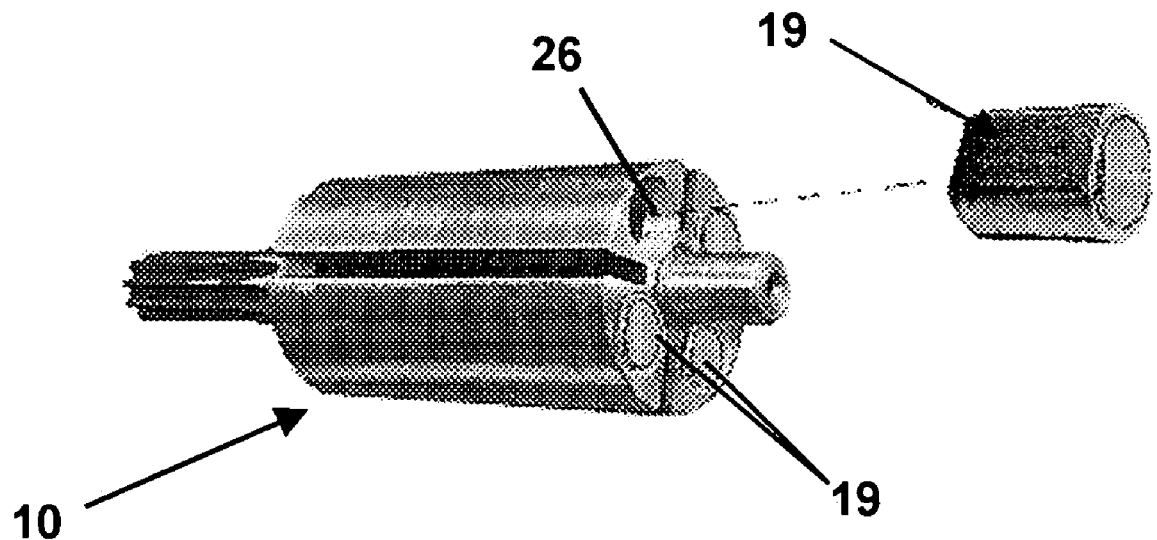
FIG. 4b is an end isometric exploded view of a rotor showing an assembled insulated subassembly according to an embodiment of the present invention.

With reference to FIGS. 4a and 4b, a rotor 10 for use in the integrated electricity generator of the present invention also comprises a rotor body 14 and a shaft 12. However, rotor body 14 contains a plurality of recesses 26 for receiving a respective insulated subassembly 19 that comprises a magnet 20 received by a nonmagnetic insulator 22. It can be seen that a conventional pneumatic tool rotor 10 may be used in conjunction with insulated subassembly 19 because insulated subassembly 19 is dimensioned to fit within recess 26, rather than project in front of rotor 10 as in the configurations of FIGS. 2 and 3. Magnet 20 in FIGS. 4a and 4b is substantially cylindrical, but machined slightly to have a flat side. This flat side is beneficial for enabling an adhesive to surround magnet 20 when magnet 20 is being inserted into nonmagnetic insulator 22, thereby improving and simplifying adhesion. Similarly, nonmagnetic insulator 22 has a flat side for enabling an adhesive for affixing insulated subassembly 19 to recess 26 of rotor body 14.

Each magnet 20 is preferably formed of sintered Neodymium (NdFeB), but may be formed of Samarium Cobalt (SmCo). NdFeB and SmCo are known as rare earth magnets, which are presently some of the most powerful permanent magnetic materials commercially available. Furthermore, rare earth magnets are advantageously very difficult to demagnetize, making them very suitable for use in the vibration-intensive environment of pneumatic tools. One drawback of the use of rare earth magnets is their potentially lower resistance to corrosion. To reduce the amount of contact by the moisture and air typical of, for instance, a compressed air stream, it is beneficial to coat the magnets prior to inserting them into the insulated subassembly 19 by using a corrosion-resistant material such as an epoxy, catalytic automotive epoxy sealant, zinc chromate or epoxychromate. Alternatively, plating may be affected, such as nickel electrodeposition.

Nonmagnetic insulator 22 may be formed of any suitable magnetically insulating material, such as nonmagnetic cast zinc, aluminum, brass or PPM 300 series stainless steel, in the form of a cup having a single open mouth in the direction of the front face of the rotor to enable magnetic flux to be openly directed towards stator windings.

As can be seen, the present invention provides the advantage that a mostly conventional pneumatic tool rotor may be used, that is only slightly modified by the creation of recesses each dimensioned to receive an insulated subassembly. The recesses for the insulated subassemblies are relatively simple to form, even in a heat-treated rotor using, for instance, a cobalt center cutting end mill or drill equivalent. Even in the case where rotors are only surface hardened, or induction hardened in a focused area such as the pinion (and thus far less costly), the present invention provides a significant advantage. The use of insulated subassemblies for placement into easy-to-form recesses on the rotor greatly reduces the amount that a conventional pneumatic tool must be altered to generate electricity. Simply put, the only alteration to a conventional rotor is the formation of recesses and the insertion of the insulated subassemblies. This procedure is much less costly in terms of time and complexity than the formation of a rotor with a shortened body appended to a nonmagnetic extension, or the formation of a hybrid two-piece rotor, as described above.

Figure 4C:
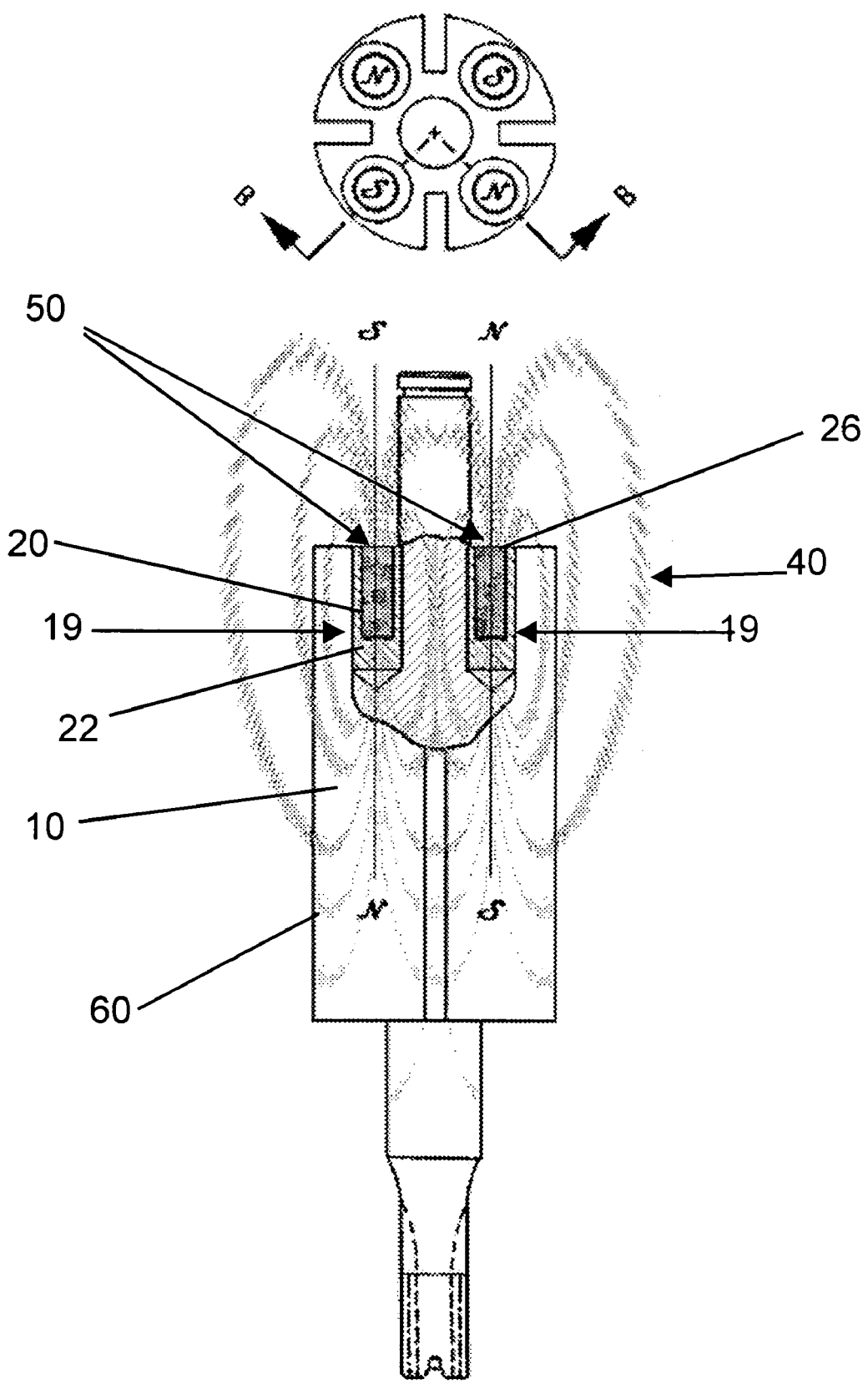
FIG. 4c is a side sectional view of the rotor of 4b showing associated magnetic flux map with concentrated flux density in the region of the stator at a face of the rotor body according to an embodiment of the present invention.

Surprisingly, it has been found that the use of the nonmagnetic insulators as shown with respect to the magnets acts to beneficially focus magnetic flux towards the stator windings. With reference to FIG. 4c, rotor 10 is shown with a superimposed representation of the flux pattern 40 of magnets 20 when insulated subassemblies 19 are placed within recesses 26 of rotor 10. Residual magnetic flux is shown as typically absorbed by iron bearing material of rotor 10 at location 60. However, it can be seen that at location 50, where stator windings would be positioned at 0.015 to 0.040 inch distance from face of rotor 10, the flux density is very concentrated. This flux density concentration is due to the influence of the nonmagnetic insulators 22, which are made of magnetically insulating and non-flux absorbent material, as described. As would be understood by one of ordinary skill in the art, increasing the concentration of flux density in this manner at location 50 adjacent the stator assists greatly in increasing the amount of EMF generated in the stator coils.

Figure 5:
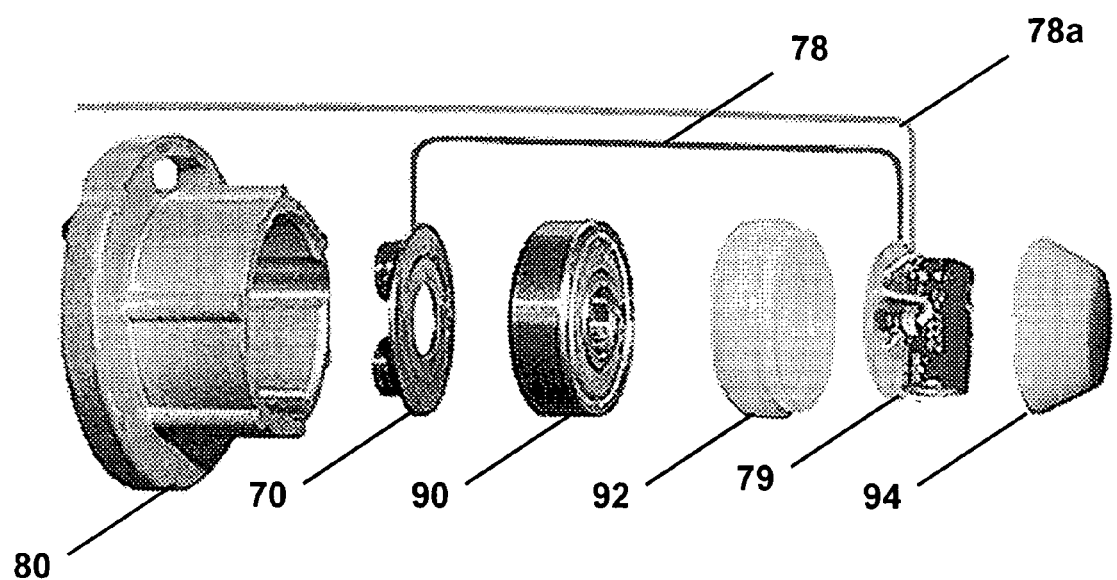
FIG. 5 is an isometric exploded view of the relationship between an end plate, a rotor bearing, the ring stator and its supporting circuit.

FIG. 5 is an exploded view of the relationship between a ring stator 70, a supporting circuit 79 and nonmagnetic air motor generator end plate 80 and rotor bearing 90. Ring stator 70 and supporting circuit 79 are linked by conductor 78. As can be seen, supporting circuit 79, mounted on a PCB board, includes diodes and a capacitor, and may include additional components for rectifying the generated electricity and for providing storage of electricity for a period of time. Supporting circuit 79 may also be mounted in other ways, such as on a Flat Flexible Circuit.

It has been found that the compact Aerogel (trademark) capacitors, known in the art of computer hardware, are extremely effective for temporarily storing generated electricity so as to provide more uniform EMF despite fluctuating rotor speed, even for a time after the rotor has stopped rotating. It has been found through experimentation that there are a significant number of conventional pneumatic tool designs that are able, due to size and/or shape constraints, to receive ring stator 70 and supporting circuit 79 as separate units coupled by a wire or ribbon cable conductor 78. By having separated supporting circuit 79 from ring stator 70, bearing 90 is able to be much closer to ring stator 70. Surprisingly, the close proximity of these two components actually acts to "flux-link" bearing 90 with ring stator 70 so as to improve the induction of magnetic flux by ring stator 70. Therefore, by separating the ring stator 70 from supporting circuit 79, EMF that might be lost due to size constraints may be at least partially regained.

Advantageously, due to its compact size, ring stator 70 can be disposed within end plate 80, between a rotor and rotor bearing 90, in order to be as close as possible to a rotor. Supporting circuit 79 is preferably encapsulated to form a solid state component in the form of a bearing cap or otherwise placed between a two-piece enclosure as shown comprising a bearing cap 92 and circuit cover 94 in order to keep circuit 79 sufficiently separated from condensation that may travel with the compressed air or other fluid passing through the tool. A ground connection (not shown) appends from an edge of the PC board to make contact with the conductive inner wall of the metallic end plate 80, completing the negative return path through the tool housing from the lighting appliance, made positive via connector 78a from supporting circuit 79.

Figure 6:
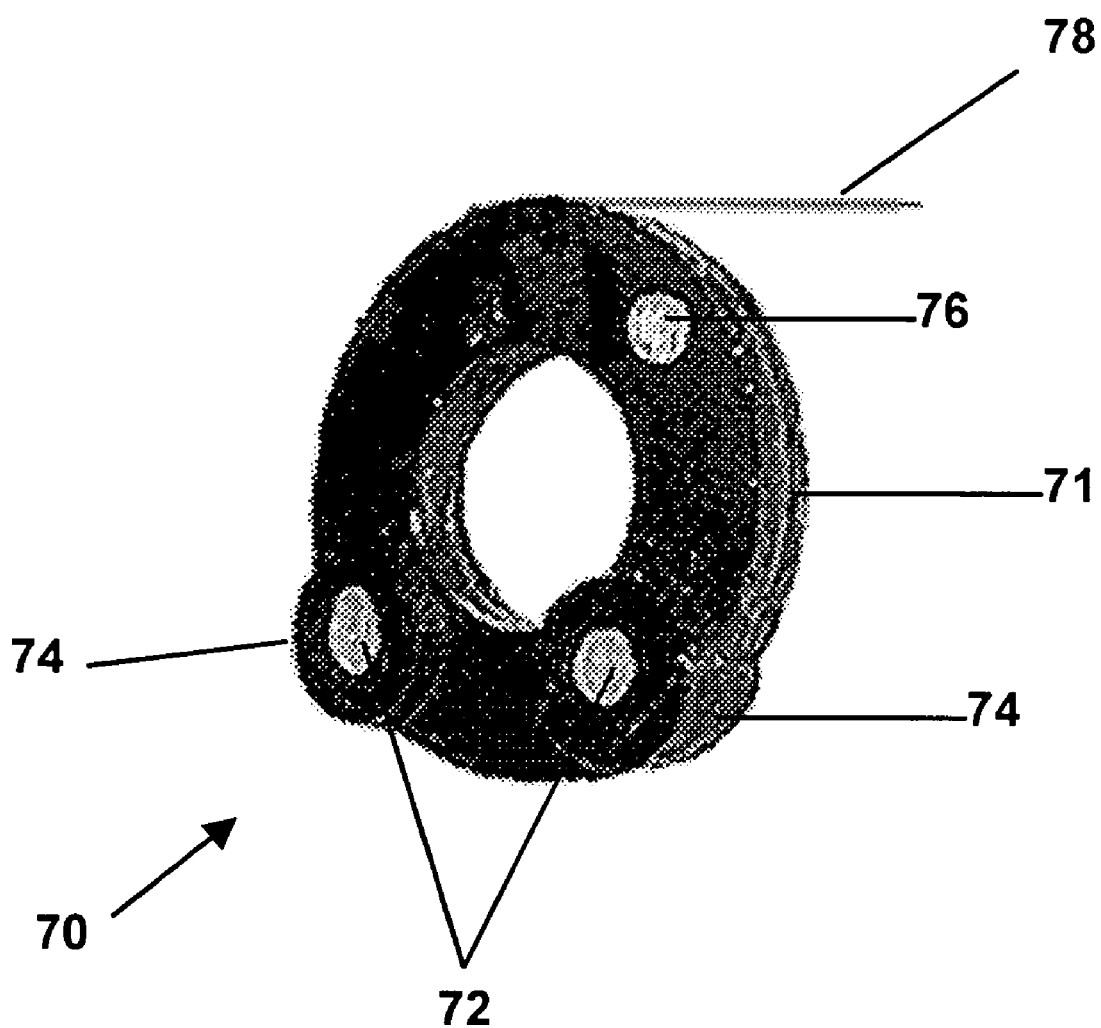
FIG. 6 is an isometric view of the ring stator, according to an embodiment of the present invention.

An enlarged perspective view of ring stator 70 is shown in FIG. 6. Ring stator 70 is machined or compression molded from Free Machinable Silicon Core Iron "B" (otherwise known as Silicon Core Iron "B-FM"). Silicon Core Iron "B-FM" is a reasonably inexpensive material that has excellent permeability permitting high flux density, and can be machined or compression molded quickly. Induction poles 72 extend from annular substrate 71 and each have wrapped there around coils 74 of magnet wire. In order to further reduce the "footprint" of ring stator 70, bobbins do not need to be used to form coils 74. Instead, magnet wire is wrapped around induction poles 72 and glued, or otherwise encapsulated in form. When using a "bondable" magnet wire, coils 74 may be held to form simply by applying a drop of denatured alcohol, which reacts with the magnet wire insulator to create an adhesive. Further epoxy may be necessary to ensure coils 74 stay to form in the vibration-intensive environment of an air tool. As would be understood by one of ordinary skill in the art, coils 74 are linked in series—one end to circuit ground 76 and the other to supporting circuit 79. Advantageously, because there are no bobbins, prior art inefficiencies due to absorption of flux by bobbin flanges are eliminated.

Figure 7:
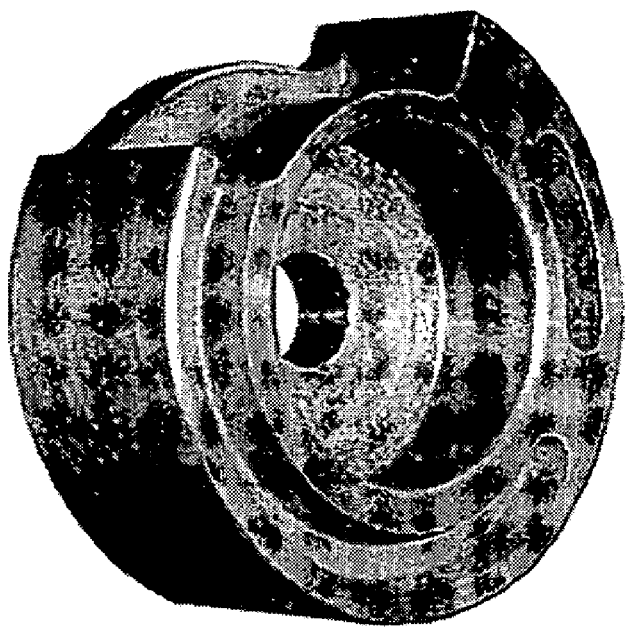
FIG. 7 is an isometric view of an end plate for a conventional pneumatic tool.
Figure 8A:
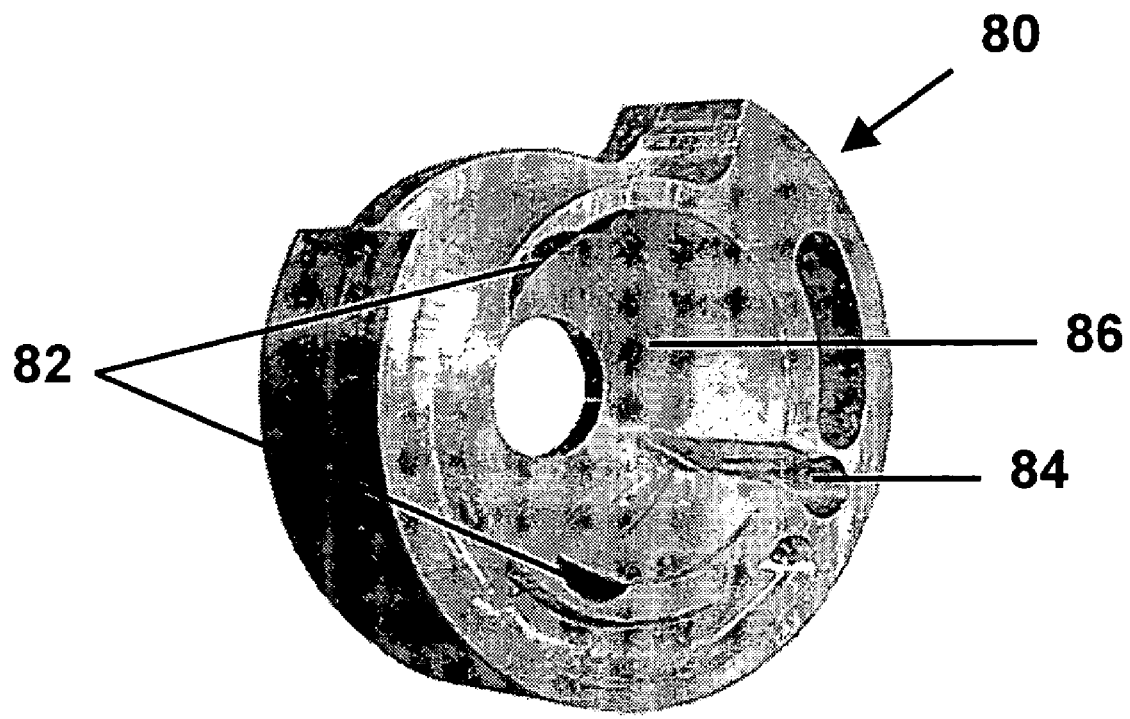
FIG. 8a is an isometric view of an end plate for supporting a ring stator, according to an embodiment of the present invention.
Figure 8B:
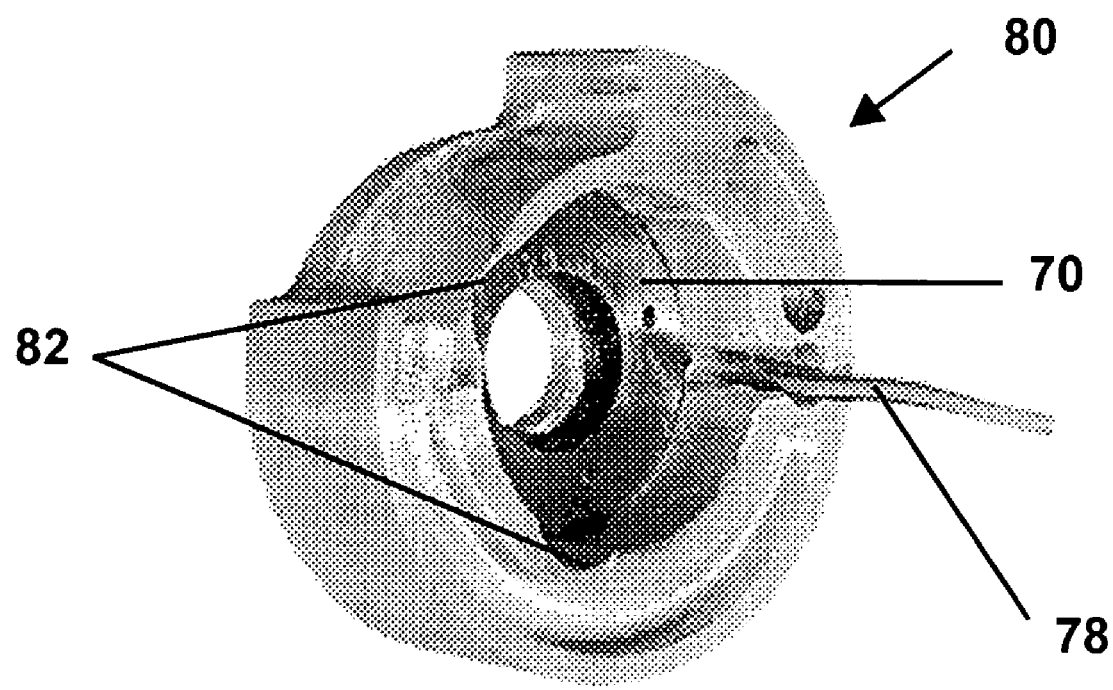
FIG. 8b is an isometric view of the end plate of FIG. 8a, supporting the ring stator.

FIG. 7 shows an enlarged perspective view of a prior art steel end plate. Turning now to FIG. 8a, an improved nonmagnetic end plate 80 for supporting ring stator 70 is shown, that is usable in both lighted and conventional pneumatic tools. End plate 80 is formed of aluminum or another nonmagnetic material so that it does not unduly interfere with the flow of flux between a rotor and ring stator 70, shown supported by end plate 80 in FIG. 8b. End plate 80 accommodates ring stator 70 by virtue of both a terminal slot 84 for connector 78 and sidewall cavities 82 for clearance for coils 74. Terminal slot 84 aligns with the motor housing thru-hole to provide access to the generated current from outside of the motor cavity. In addition, end plate 80 has a reduced-thickness end wall 86 in order to decrease the magnetic gap between rotor magnets and induction poles 72 of ring stator 70. End wall 86 also receives a shaft of a rotor by virtue of an opening formed therethrough.

Conductors 78 and 78a can be wire or ribbon cable, or a run within a discrete single circuit comprised of Flat Flexible Circuit.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, while the preferred embodiment has been shown with four insulated subassemblies on one end of a rotor, it will be understood that any number of insulated subassemblies may be received by the rotor, dependent in part on the size of the insulated subassemblies, the configuration of the slots for receiving vanes with respect to the front face of the rotor in which the insulated subassemblies are received and that what ever the number of insulated subassemblies may be, that there be an even number of magnetic poles disposed on the end of the rotor.

Furthermore, while the magnets, nonmagnetic insulators and rotor recesses have been shown as generally cylindrical, it will be understood that these components may be of any configuration, shape or dimension sufficient to impart magnetic flux against the inductors and hence coil windings of a stator, as long as the relationship between the magnets and the nonmagnetic insulators are such that the magnets are isolated from substantially all but the stator, and embeddable therein.

While the nonmagnetic insulator has been shown in the form of a cup, the nonmagnetic insulator may be formed in the shape of a box, bowl, open-ended tube, triangular, or the like. It is sufficient that the nonmagnetic insulator receives a magnet, is receivable in a corresponding recess of the rotor, and acts to surround the magnet with non flux-absorbent material in such a manner that flux is still directed towards the inductors and coil windings of the stator.

While it is advantageous to make use of some of the strongest, most demagnetizing-resistant magnets commercially available such as NdFeB or SmCo for the rotor, it will be understood that the present invention would work using magnets of any magnetic material, albeit at the cost of reduced induced EMF in the stator coils.

Furthermore, it is conceivable that a rotor having the recesses could be used in a conventional pneumatic tool, such that both the conventional pneumatic tool and an electricity-generating counterpart use the exact same rotor. In fact, it is common practice throughout both automotive and industrial pneumatic tool industries for engineers to provide recessed rotors in pneumatic tool motors to decrease the amount of material used to create the rotor in both plastic injection molding and PPM rotor construction, and also to decrease the overall weight of the tool in the larger air tools. However, the formation of recesses dimensioned to receive the insulated subassemblies provides a combination of weight loss for conventional tools and simple conversion to electricity-generating capabilities, where the rotor is concerned. Manufacturing is thus greatly simplified.

While the above has been described with reference to a pneumatic tool having a primary function such as a sander, grinder or wrench, it is to be understood that the present invention is applicable to tools having other primary functions. One might also conceive of applications wherein the primary function of the tool is to generate electricity for various applications.

What is claimed is:

1. An end plate for supporting a ring stator for cooperating with a rotor in an integrated electricity generator for a pneumatic tool, wherein said stator comprises:
   an annular ring dimensioned to receive a shaft of said rotor;
   at least one induction pole, each of said at least one induction pole depending from said annular ring and having mounted thereon a respective coil;
   an output connector connected to said coils for transferring generated electricity to a load; and
   wherein said end plate is formed of a nonmagnetic material and comprises
   an end wall having an opening dimensioned to receive said shaft of said rotor;
   an annular side wall depending from said end wall and having formed on its inward side a terminal slot for accommodating said connector and cavities for accommodating respective ones of said coils of said stator;
   wherein said stator may supported by said annular side wall against said annular end wall.

2. A stator for cooperating with a rotor in an integrated electricity generator for a pneumatic tool, comprising:
   an annular substrate having an opening therethrough for accommodating a shaft of said rotor;
   at least one induction pole, each of said at least one induction pole depending from said annular substrate and having mounted thereon a respective coil;
   an output connector connected to each said respective coil;
   wherein said output connector transfers generated electricity from each said respective coil when said rotor rotates relative to said stator.

3. The stator of claim 2, wherein said output connector transfers generated electricity to a supporting circuit comprising a capacitor.

4. The stator of claim 3, wherein said capacitor is an Aerogel capacitor.

5. The stator of claim 3, wherein said supporting circuit and said stator are connected only by said output connector.

6. The stator of claim 3, wherein said supporting circuit is encapsulated to prevent contact with condensation formed in said pneumatic tool.

7. The stator of claim 2, wherein the annular substrate and induction poles are formed of Silicon Core Iron "B".

8. The stator of claim 2, wherein each said respective coil is formed directly on a respective induction pole without a bobbin.

9. The stator of claim 8, wherein each said respective coil is formed of magnet wire.

10. The stator of claim 9, wherein said magnet wire is bondabie and held to coil form by application of denatured alcohol.

11. The stator of claim 8, wherein each said respective coil is held to coil form by application of epoxy.

12. The stator of claim 2, disposed within an end plate between said rotor and a rotor bearing.

13. In an integrated electricity generator for a pneumatic tool, an end plate for supporting a stator, said stator having a ring shape, at least one coil and an output connector for transferring generated electricity from said coil, said end plate formed of nonmagnetic material and comprising:
   an end wall having an opening therethrough for receiving a shaft of a rotor;
   an annular sidewall depending from said end wall and having formed therein a terminal slot for accommodating said connector and at least one cavity for accommodating a respective one of said at least one coil.

14. The end plate of claim 13, wherein said nonmagnetic material is aluminum.

* * * * *